July 16, 1968     F. V. TIERNEY     3,392,449
INSTANT MARKER
Filed April 27, 1967
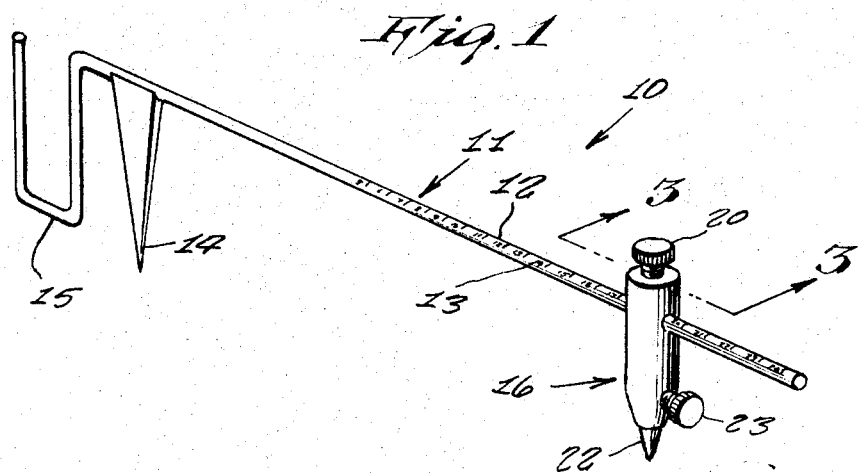
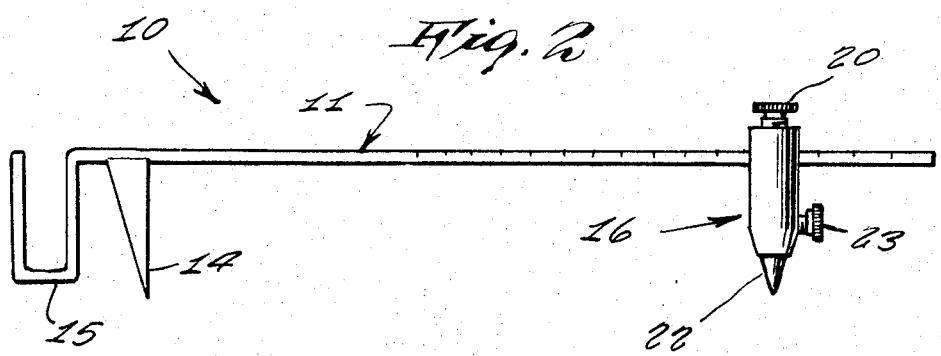
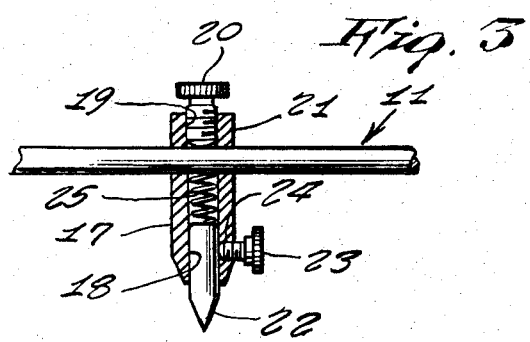
INVENTOR
F. V. TIERNEY

United States Patent Office 3,392,449
Patented July 16, 1968

3,392,449
INSTANT MARKER
Francis V. Tierney, 112 5th Ave. N.,
Princeton, Minn. 55371
Filed Apr. 27, 1967, Ser. No. 634,267
1 Claim. (Cl. 33—27)

ABSTRACT OF THE DISCLOSURE

A marking device, including an elongated bar having an adjustable chalk or pencil holder and having at the other end a pointed spur and a guide.

This invention relates generally to marking devices.

A principal object of the present invention is to provide an instant marker which can either draw a straight line which is parallel to a guide edge, and which may be used for inscribing a circle or an arc of a circle.

Another object of the present invention is to provide an instant marker which will permit the user to see the beginning mark without any difficulty while making a second mark.

Yet another object of the present invention is to provide an instant marker wherein a person may keep both hands upon the device for accurate marking and the person will not have to hunt for a pencil between making marks.

Yet another object is to provide an instant marker which will replace the use of a straight edge device.

Other objects of the present invention are to provide an instant marker which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention;

FIGURE 2 is a side elevation view thereof;

FIGURE 3 is a cross sectional view taken along the line 3—3 of FIGURE 1.

Referring now to the drawing in detail, the reference numeral 10 represents an instant marker, according to the present invention wherein there is an elongated measuring rod 11 which may be provided with a plurality of equally spaced apart graduations 12 and with numerals 13 to define dimensions. The rod 11 comprises a straight member which is provided at one end with a pointed spur 14 and with a guide 15.

A slidable pencil or chalk holder 16 is carried slidably free along the measuring rod 11, the holder having self-contained means for being selectively secured along any position of the measuring rod. The pencil or chalk holder comprises a cylindrically configurated member 17 having a central opening 18 extending therethrough, the opening being threaded at one end 19 for purpose of being threadingly engaged with a set screw 20. An opening 21 is made transversely through the cylindrical member 17 for purpose of receiving the measuring rod 11 therethrough. At the opposite end of the member 17, the outer wall is tapered towards its terminal end, and a chalk or pencil 22 is fitted into the opening 18 and is retained in position by means of a transverse extending set screw 23 engaged in threaded opening 24 in the member 17. A compression coil spring 25 is fitted between the upper end of the chalk or pencil 22 and the measuring rod 11.

As is shown in FIGURE 2 of the drawing, it is to be noted that the pointed spur 14 is slightly longer than the guide 15.

In operative use the device may be used for drawing a circle or drawing a straight line an equal distance to a guided edge. To describe a circle the pencil or chalk holder is first moved along the measuring rod to the selected radial dimension by simply loosening the set screw 20 thereby allowing the holder to freely slide along the rod. Thereafter the set screw 20 is locked against the measuring rod and with the pointed spur in position at the center of the circle, the holder 16 is pivoted therearound while at the same time the pencil or chalk 22 is making a visible line. In order to draw or mark a straight line parallel to a guide edge, the guide 15 is moved alongside a guide edge, the guide being retained as sufficiently elevated so that the spur 14 does not engage the writing or drawing surface, the straight horizontal portion of the guide 15 resting against the side of the guide edge so to maintain the device constant along the axis of travel and prevent the holder 16 to wander laterally.

In operative use it is to be further noted that the instant marker can be useful in many fields. It can prove useful to mark out window cut-outs, on sheet rock handling and the like. It is to be further noted that the measuring rod can be made of any material desired or any length desired so that it may be made to accommodate other fields requiring less or greater length.

While various changes may be made in the detailed construction, it is understood that such changes will be within the spirit and scope of the invention as is defined by the appended claim.

I claim:

1. In an instant marker, the combination of a measuring rod, a pencil or chalk holder slideably adjustable upon said measuring rod, said measuring rod having a pointed spur near one end thereof, and a guide member adjacent the pointed spur, said measuring rod comprising an elongated member which is of straight configuration, said rod having a plurality of equally spaced apart graduations and numeral defining linear dimensions imprinted along the length thereof, said pointed spur and guide member being integrally formed with said measuring rod, said pencil and chalk holder comprising a cylindrical member having a central opening extending therethrough, said opening being threaded at one end for being threadingly engaged to a set screw, a transverse extending opening extending through said cylindrical member for purpose of receiving said measuring rod therethrough, said set screw being selectively locked or unlocked against said measuring rod, a pencil or chalk received within the other end of said central opening, a transverse extending set screw engaged within a threaded opening in the side of said cylindrical member for selectively locking said pencil or chalk within said end of said central opening, a compression coil spring between the end of said pencil or chalk and said measuring rod, said end of said cylindrical member adjacent said pencil or chalk being tapered to afford better visibility of the pencil or chalk point, and said guide member comprising a U-shaped terminal end comprised of a first leg adjacent an end of said measuring rod, and extending perpendicular thereto, a second leg parallel with said first leg, and said legs being interconnected by a transverse leg parallel to said measuring rod.

References Cited

UNITED STATES PATENTS

| | | |
|---|---|---|
| 1,191,725 | 7/1916 | Paulsen. |
| 2,209,250 | 7/1940 | Manthey _____ 33—42 |
| 2,621,412 | 12/1952 | Slusher _____ 33—158 |
| 3,015,889 | 1/1962 | Godman _____ 33—42 X |

FOREIGN PATENTS 5,372   1909   Great Britain.

OTHER REFERENCES

Publication (I): "The Ambi Combination Compass," Jan. 18, 1954.

Publication (II): "Popular Mechanics," July 1945, page 139, "Flexible Beam Compass."

HARRY N. HAROIAN, *Primary Examiner.*